United States Patent
Al-Khafaji et al.

(10) Patent No.: US 9,667,103 B2
(45) Date of Patent: May 30, 2017

(54) MAIN ELEMENT OF AN ELECTRIC MACHINE

(71) Applicant: SIEMENS AKTIENGESELLSCHAFT, München (DE)

(72) Inventors: Hayder Al-Khafaji, Nürnberg (DE); Manfred Hetterich, Windsbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/117,617

(22) PCT Filed: Jan. 21, 2015

(86) PCT No.: PCT/EP2015/051097
§ 371 (c)(1),
(2) Date: Aug. 9, 2016

(87) PCT Pub. No.: WO2015/117822
PCT Pub. Date: Aug. 13, 2015

(65) Prior Publication Data
US 2016/0359381 A1    Dec. 8, 2016

(30) Foreign Application Priority Data
Feb. 10, 2014 (EP) .................................. 14154478

(51) Int. Cl.
*H02K 3/28* (2006.01)
*H02K 1/08* (2006.01)
(Continued)

(52) U.S. Cl.
CPC ............... *H02K 1/146* (2013.01); *H02K 1/08* (2013.01); *H02K 1/24* (2013.01); *H02K 3/12* (2013.01); *H02K 3/28* (2013.01); *H02K 15/026* (2013.01)

(58) Field of Classification Search
CPC  H02K 1/146; H02K 1/08; H02K 1/24; H02K 3/12; H02K 3/28; H02K 15/026
(Continued)

(56) References Cited

U.S. PATENT DOCUMENTS 4,217,690 A    8/1980 Morreale
4,296,543 A *  10/1981 Hamane ............. H02K 15/0435
                                                    29/596
(Continued)

FOREIGN PATENT DOCUMENTS

DE    20 12 468 A1    11/1970
EP       0006514 A1    1/1980
(Continued)

*Primary Examiner* — Michael Andrews
(74) *Attorney, Agent, or Firm* — Henry M. Feiereisen LLC

(57) ABSTRACT

The invention relates to a main element (400) of an electric machine. Said main element (400) comprises several winding strands (100, 200, 300) with electric coils (101, 102, 201, 202, 301, 302) which interconnected so as to be electrically conductive and a winding core (K) which comprises first grooves (1, 3, 4, 6, 7, 9), through which the precisely one coil (101, 102, 201, 202, 301, 302) runs, and second grooves (2, 5, 8), through which precisely two different coils (101, 102, 201, 202, 301, 302) run. Each coil (101, 102, 201, 202, 301, 302) of each winding strand (100, 200, 300) is either a first coil (101, 201, 301) which runs through two first grooves (1, 3, 4, 6, 7, 9), or a second coil (102, 202, 302) which runs through two second grooves (2, 5, 8).

6 Claims, 6 Drawing Sheets

(51) Int. Cl.
*H02K 1/14* (2006.01)
*H02K 1/24* (2006.01)
*H02K 3/12* (2006.01)
*H02K 15/02* (2006.01)

(58) Field of Classification Search
USPC .......................................... 310/179, 180–209
See application file for complete search history.

(56) References Cited

U.S. PATENT DOCUMENTS

| | | | |
|---|---|---|---|
| 5,300,846 A | 4/1994 | Miller | |
| 5,668,429 A * | 9/1997 | Boyd, Jr. | H02K 3/28 |
| | | | 310/179 |
| 2007/0273236 A1 | 11/2007 | Kaumann | |
| 2010/0231082 A1* | 9/2010 | Bodin | H02K 3/12 |
| | | | 310/195 |
| 2012/0043846 A1* | 2/2012 | Wolfington | H02K 3/28 |
| | | | 310/195 |

FOREIGN PATENT DOCUMENTS

| | | |
|---|---|---|
| EP | 1 860 757 A1 | 11/2007 |
| FR | 1 182 348 A | 6/1959 |
| GB | 24 63 767 A | 3/2010 |
| JP | 2001025197 A | 1/2001 |

\* cited by examiner

MAIN ELEMENT OF AN ELECTRIC MACHINE

CROSS-REFERENCES TO RELATED APPLICATIONS

This application is the U.S. National Stage of International Application No. PCT/EP2015/051097, filed Jan. 21, 2015, which designated the U.S. and has been published as International Publication No. WO 2015/117822 and which claims the priority of European Patent Application, Serial No. 14154478.3, filed Feb. 10, 2014, pursuant to 35 U.S.C. 119(a)-(d).

BACKGROUND OF THE INVENTION

The invention relates to a main element of an electric machine which comprises several winding strands with electric coils which are interconnected so as to be electrically conductive and a winding core with grooves lined up next to each other through which coils of the winding strands run.

A main element of an electric machine is understood to mean a stator or a rotor of the electric machine. An electric coil comprises several windings of electrical conductors arranged immediately adjacent to and/or on top of each other and electrically interconnected in series or of so-called combined electrical conductor elements arranged adjacent to and/or on top of each other, which are connected electrically in parallel and have the same or a different design with respect to their geometric structure and/or their diameter. A winding strand is understood to mean coils electrically interconnected in series and/or connected in parallel which are supplied with currents in phase. A winding of a main element of a multi-phase electric machine therefore has a number of winding strands consistent with the number of phases, wherein each winding strand is connected to an external conductor.

The individual coils of a winding strand of a main element are frequently distributed in grooves of a hub of the main element, for example, in grooves of a stator core, so that each coil runs through two grooves. As a rule, the grooves are arranged in a row next to each other in a surface facing an air gap between a stator and a rotor of the electric machine. The two grooves traversed by a coil may be immediately adjacent or grooves may be located between them through which other coils run (so-called distributed winding). Furthermore, a winding may be designed as a so-called single layer winding in which only precisely one coil runs through each groove, or as a so-called two-layer winding in which precisely two different coils run through each groove.

In a two-layer winding the two coils running through a groove may pertain to the same winding strand or to different winding strands. As a rule, the volume of each groove is divided by an electrically insulating partition wall into two areas of roughly the same size through which one of the two coils running through the groove runs respectively. A first of these areas extends from the base of the groove to the partition wall and contains the so-called lower layer of the groove which is formed by the coil running through the first area. The second area extends from the partition wall to the opening of the groove in the surface of the hub and contains the so-called upper layer of the groove which is formed by the coil running through the second area. Usually each coil of a two-layer winding forms a lower layer of a first groove through which it runs and an upper layer of the second groove through which it runs.

In a distributed two-layer winding, as a rule the coils must be created individually on account of their coil overlap. A coil is, for example, retracted mechanically. Retraction of a coil is understood to mean that, for example, with the aid of a template, a loose, pre-wound coil is retracted into grooves in a single operation.

SUMMARY OF THE INVENTION

The task of the invention is to specify an improved main element of an electric machine comprising several winding strands. Furthermore, the task of the invention is to specify a method for producing such a main element.

According to one aspect of the invention, the object is achieved by a main element of an electric machine, which main element comprises several winding strands with electric coils which are interconnected so as to be electrically conductive and a winding core with grooves lined up next to each other through which coils of the winding strands run. The winding core has first grooves through which precisely one coil runs, and second grooves through which precisely two different coils run. Furthermore, each coil of each winding strand is either a first coil which runs through the two first grooves, or a second coil which runs through two second grooves, and each winding strand has at least one first coil and at least one second coil.

According to another aspect of the invention, a method for producing a main element includes drawing all the coils of at least one winding strand into grooves simultaneously.

Advantageous embodiments of the invention are the subject of subclaims.

A main element according to the invention therefore has one winding with several winding strands the coils of which are distributed as first grooves designed as "single layer grooves" and as second grooves designed as "two-layer grooves". Advantageously, this enables the coils of the winding strands to be arranged such that several or all of the coils of a winding strand can be retracted simultaneously. As a result, the production of a main element can be considerably simplified and reduced in price.

An embodiment of the invention provides for precisely three winding strands, wherein each second coil of each winding strand forms an upper layer of one of the two second grooves through which it runs, and a lower layer of the other of the two second grooves through which it runs.

A further embodiment of the invention provides for precisely three winding strands, wherein each second coil of a first winding strand forms the lower layers of the two second grooves through which it runs, each second coil of a second winding strand forms an upper layer of one of the two second grooves through which it runs, and a lower layer of the second of the two second grooves through which it runs, and each second coil of the third winding strand forms the upper layers of the two second grooves through which it runs.

As a result of this distribution of the second coil of the three winding strands, the second coils of the first winding strand can be advantageously retracted first simultaneously, thereafter the second coils of the second winding strand and finally simultaneously the second coils of the third winding strand.

Preferably each first coil of each winding strand runs through a pair of two first grooves between which at least two further first grooves and at least two second grooves are located, and each second coil of each winding strand runs through two second grooves which are located between two first grooves of a pair of grooves through which a first coil of the same winding strand runs.

Advantageously, as a result the first coils of a winding strand can be retracted at the same time as the second coils of the winding strand.

Furthermore, each of the additional first grooves which are located between the two first grooves of a pair of grooves through which a first coil of a winding strand runs are preferably located between the two second grooves which are located between the two first grooves of the pair of grooves. Furthermore, the two further first grooves are traversed by first coils of two different winding strands which moreover distinguish themselves from the winding strand pertaining to the first coil traversing the pair of grooves.

Through this distribution of coils to grooves which is described in detail hereinafter with reference to exemplary embodiments, a spatially even distribution of the coils of the three winding strands is advantageously achieved which nevertheless permits all the coils of a winding strand to be retracted simultaneously.

A further embodiment of the invention provides that an electrically insulating partition wall is arranged in each second groove between the two second coils which run through them.

As a result, the two second coils running through a second groove are electrically isolated from each other advantageously.

A further embodiment of the invention provides that all the first coils have a consistent first number of windings and all the second coils a consistent second number of windings.

As a result, all the first coils and all the second coils each have the same design, further simplifying production.

A first further development of this embodiment provides that the first number of windings is twice as great as the second number of windings.

As a result, the first grooves and second grooves can have the same design because the first coils are twice as large as the second coils if the individual windings of the first and second coils have the same design.

In the aforementioned further development, each first coil is preferably stabilized in the first groove through which it runs by means of a stabilization mass inserted into these first grooves. An epoxy resin is preferably used as a stabilization mass.

This further development takes into account that the first grooves have no partition walls so that in the case of homogeneously designed grooves and homogeneously designed windings of the first and second coils there is an empty space in each of the first grooves if the number of windings of the first coils is precisely twice as great as the number of windings of the second coils. The stabilization mass serves to fill this empty space in order to stabilize the first coils in the first grooves.

An alternative further development provides that the first number of windings is more than twice as great as the second number of windings.

As a result, the first coils can be enlarged by additional windings so that there are no empty spaces in the first grooves. Furthermore, the additional windings can advantageously improve a winding factor of a stator signal field and reduce a current asymmetry of the winding, as explained in more detail hereinafter.

In the method according to the invention for producing a main element according to the invention all the coils of at least one winding strand are simultaneously retracted into grooves.

As aforementioned, the effort and cost of the production of a main element can be substantially reduced as a result.

BRIEF DESCRIPTION OF THE DRAWING

The aforementioned properties, features and advantages of this invention and the manner in which these are obtained are clearer and more understandable in connection with the following description of exemplary embodiments which are explained in more detail in connection with the drawings. These show.

DETAILED DESCRIPTION OF PREFERRED EMBODIMENTS

Figure 1:
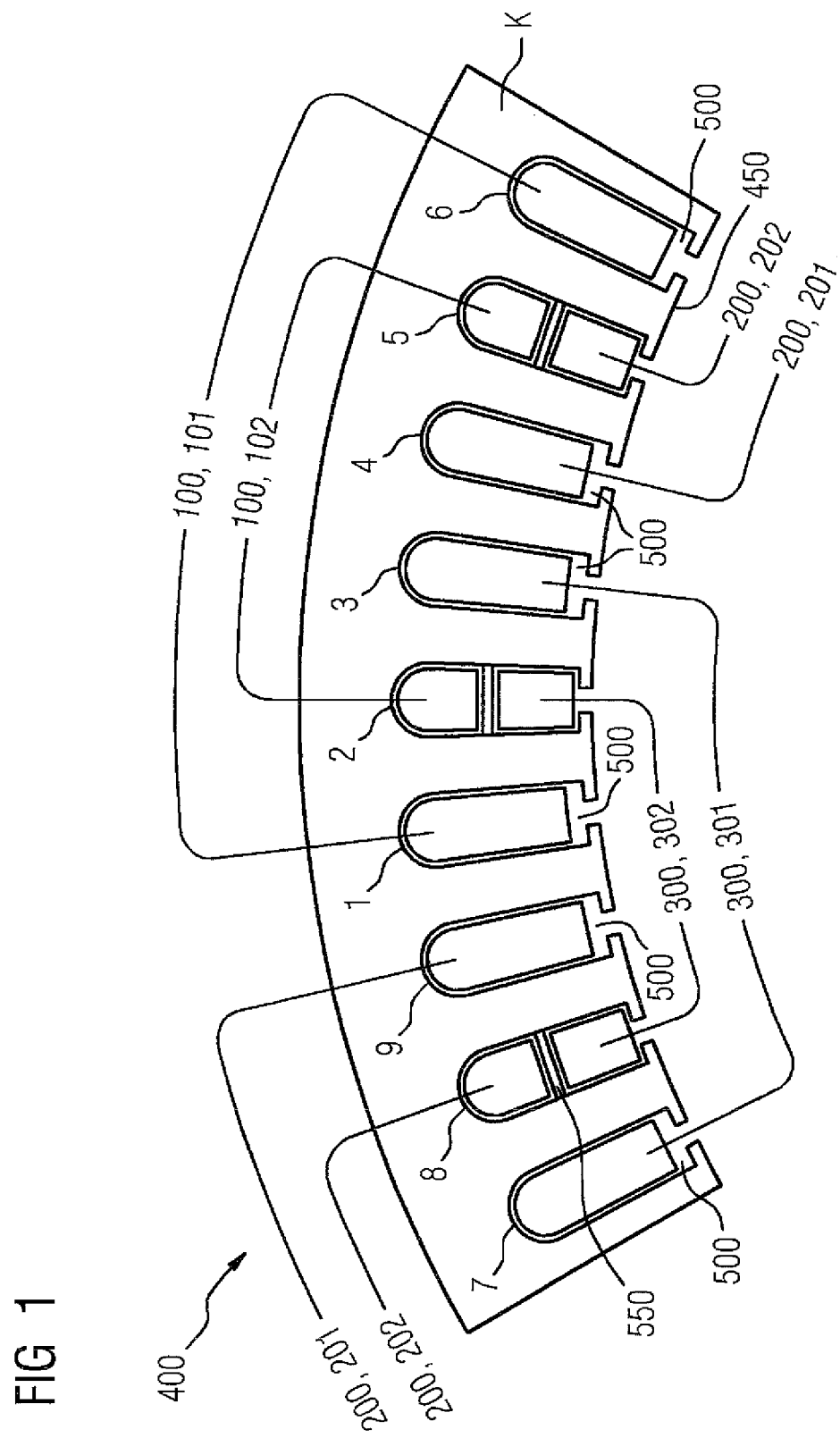
FIG. 1 a diagrammatic and partial view of a first exemplary embodiment of a main element of an electric machine, FIG. 2 a partial area plan of a winding, FIG. 3 a partial plan of a winding, FIG. 4 a winding scheme of a winding, FIG. 5 a diagrammatic and partial view of a second exemplary embodiment of a main element of an electric machine, FIG. 6 a winding factor range of a stator dimensional field of the first exemplary embodiment shown in FIG. 1, FIG. 7 a winding factor range of a stator dimensional field of the second exemplary embodiment shown in FIG. 5, and FIG. 8 standardized copper losses of the windings of the exemplary embodiments shown in FIGS. 1 and 5.

Corresponding parts have the same reference characters in all the figures.

FIG. 1 shows a diagrammatic view of a section of a first exemplary embodiment of a main element 400 of a three-phase electric machine in a cutaway view. The main element 400 of this exemplary embodiment is embodied as a stator of the electric machine and has a winding with three winding strands 100, 200, 300 and a winding core K embodied as a stator core with grooves 1 to 9. The stator core is preferably embodied as a laminated iron core.

The main element 400 has an essentially circular cross section of which only a portion constituting a sixth of the entire cross section is shown in FIG. 1. The grooves 1 to 9 are located in a longitudinal axis of the surface 450 facing the main element 400 of a stator bore of the hub K, are open or half closed in the direction of the stator bore, each run in a radial direction with regard to the longitudinal axis of the main element 400, and are arranged equidistant to each other on a circumference in the surface 450 around the longitudinal axis of the main element 400.

Each winding strand 100, 200, 300 has several interconnected electric coils 101, 102, 201, 202, 301, 302 each of which runs through two grooves 1 to 9 of the hub K.

Each groove 1 to 9 is either a first groove 1, 3, 4, 6, 7, 9 through which precisely one coil 101, 102, 201, 202, 301, 302 runs or a second groove 2, 5, 8 through which precisely two coils 101, 102, 201, 202, 301, 302 run. Each coil 101, 102, 201, 202, 301, 302 is either a first coil 101, 201, 301 which runs through precisely two different first grooves 1, 3, 4, 6, 7, 9 or a second coil 102, 202, 302 which runs through precisely two different second grooves 2, 5, 8.

The precise distribution of the coils 101, 102, 201, 202, 301, 302 in the grooves 1 to 9 is described hereinafter with reference to the FIGS. 2 to 4.

Figure 2:
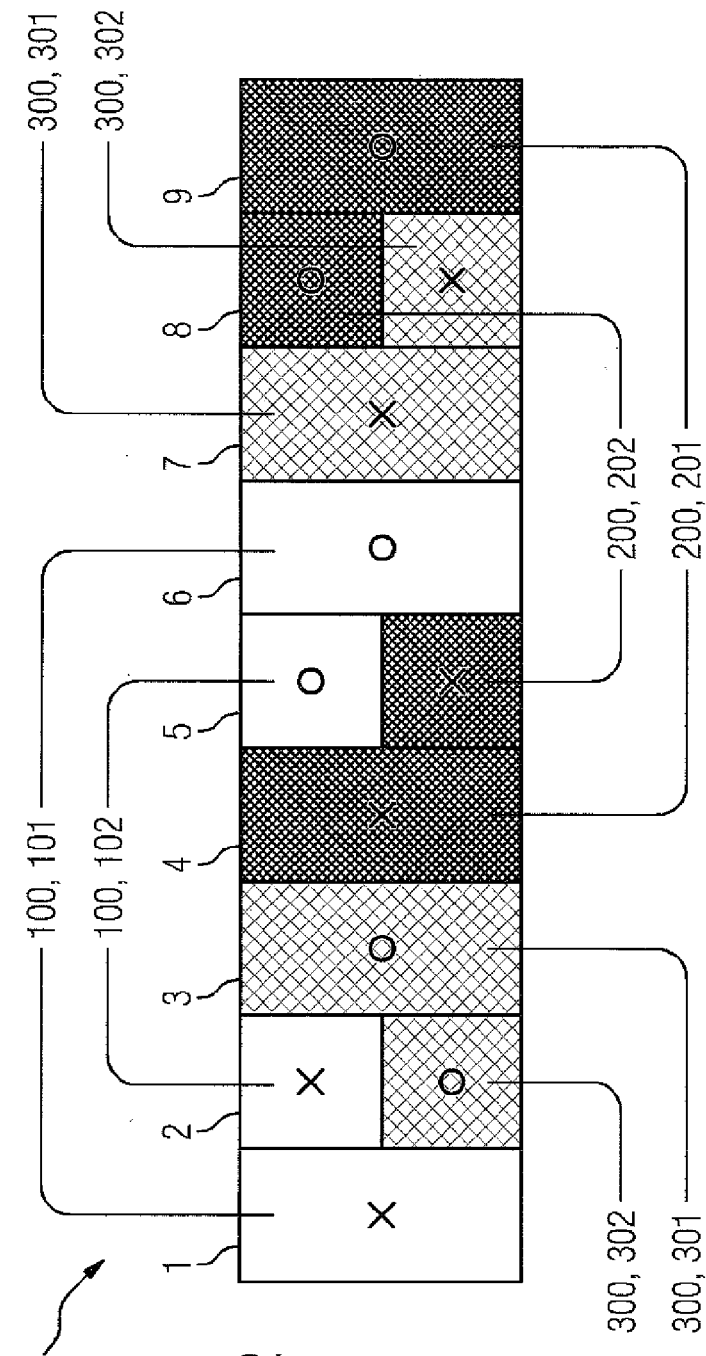
Figure 3:
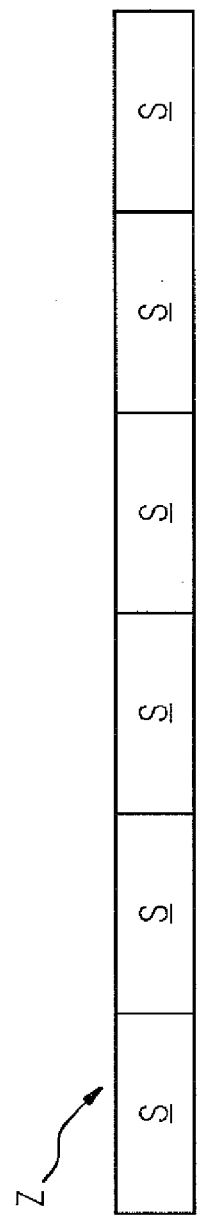

FIGS. 2 and 3 show an area plan Z of the winding of the main element 400 shown partially in FIG. 1. In accordance with FIG. 3, the area plan Z comprises six identical partial area plans S which are arranged consecutively and each present nine grooves 1 to 9. FIG. 2 shows a partial area plan S. The crosses and circles in the partial area plan S indicate the directions in which the grooves 1 to 9 are traversed along the winding strands 100, 200, 300 by the windings of the associated coils 101, 102, 201, 202, 301, 302, wherein a cross indicates the direction of the drawing plane and a circle the direction away from the drawing plane.

Figure 4:
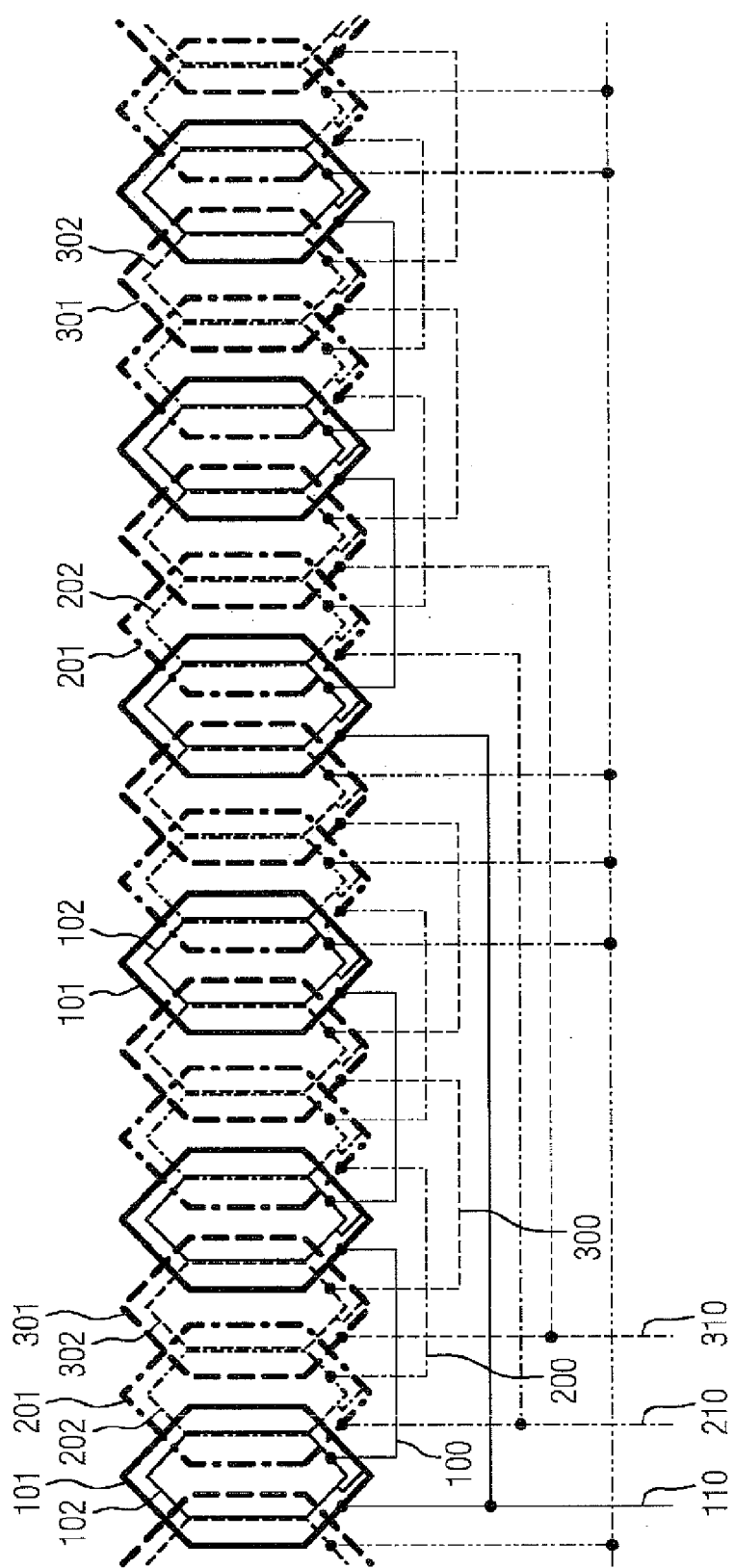

FIG. 4 shows a winding scheme of the winding of the main element 400 partially shown in FIG. 1 corresponding to an area plan Z shown in FIGS. 2 and 3. Also shown are the electrical wiring of the coils 101, 102, 201, 202, 301, 302 and three external conductors 110, 210, 310 which are each connected to one of the winding strands 100, 200, 300.

Each first coil 101, 201, 301 of each winding strand 100, 200, 300 runs through a pair of two first grooves 1, 3, 4, 6, 7, 9 between which precisely two second grooves 2, 5, 8 through which a second coil 102, 202, 302 of the same winding strand 100, 200, 300 runs and precisely two further first grooves 1, 3, 4, 6, 7, 9 are located. The two further first grooves 1, 3, 4, 6, 7, 9 are in turn located between the two second grooves 2, 5, 8. A first coil 101, 201, 301 of one of the two other winding strands 100 runs through each of the two further first grooves 1, 3, 4, 6, 7, 9, 200, 300, wherein these two first coils 101, 201, 301 pertain to different winding strands 100, 200, 300.

In detail, the first grooves 1, 6 of each partial area plan S form a pair of grooves through which a first coil 101 of a first winding strand 100 runs. The first grooves 4, 9 of each partial area plan S form a pair of grooves through which a first coil 201 of a second winding strand 200 runs. A first groove 7 of each partial area plan S and a first groove 3 of the partial area plan S adjoining this partial area plan S on the right form a pair of grooves through which a first coil 301 of the third winding strand 300 runs.

Each second coil 102 of the first winding strand 100 runs through the second groove 2, 5 of a partial area plan S. Each second coil 202 of the second winding strand 200 runs through the second grooves 5, 8 of a partial area plan S. Each second coil 302 of the third winding strand 300 runs through the second groove 8 of a partial area plan S and the second groove 2 of the partial area plan S adjoining this partial area plan S on the right.

Each second coil 102 of the first winding strand 100 forms the lower layers of the two second grooves 2, 5 through which it runs. Each second coil 202 of the second winding strand 200 forms an upper layer of a second groove 5 through which it runs, and a lower layer of the other second groove 8 through which it runs. Each second coil 302 of the third winding strand 300 forms the upper layers of the two second grooves 2, 8 through which it runs (the lower layers of the second grooves 2, 5, 8 are shown in FIG. 2 above the upper layers). The lower layer and the upper layer of each second groove 2, 5, 8 are separated from each other by an electrically insulating partition wall 550.

All the first coils 101, 201, 301 have a consistent first number of windings and all the second coils 102, 202, 302 have a consistent second number of windings. The first number of windings in this first exemplary embodiment is twice as great as the second number of windings. Furthermore, all the coils 101, 102, 201, 202, 301, 302 are made of a diameter consistent with a round wire. Each first coil 101, 201, 301 is therefore twice as large as a second coil 102, 202, 302. In addition, all the grooves 1 to 9 are identical in design.

The second coils 102, 202, 302 and the partition walls 550 are calculated in such a manner that the volumes of the second grooves 2, 5, 8 are respectively filled by the second coils 102, 202, 302 running through them and by the partition walls 550. Empty spaces 500 therefore occur in the first grooves 1, 3, 4, 6, 7, 9 as a result of the absence of partition walls 550 there. These empty spaces 500 are each filled by a stabilization mass, preferably by an epoxy resin, to stabilize the first coils 101, 201, 301 in the first grooves 1, 3, 4, 6, 7, 9.

Figure 5:
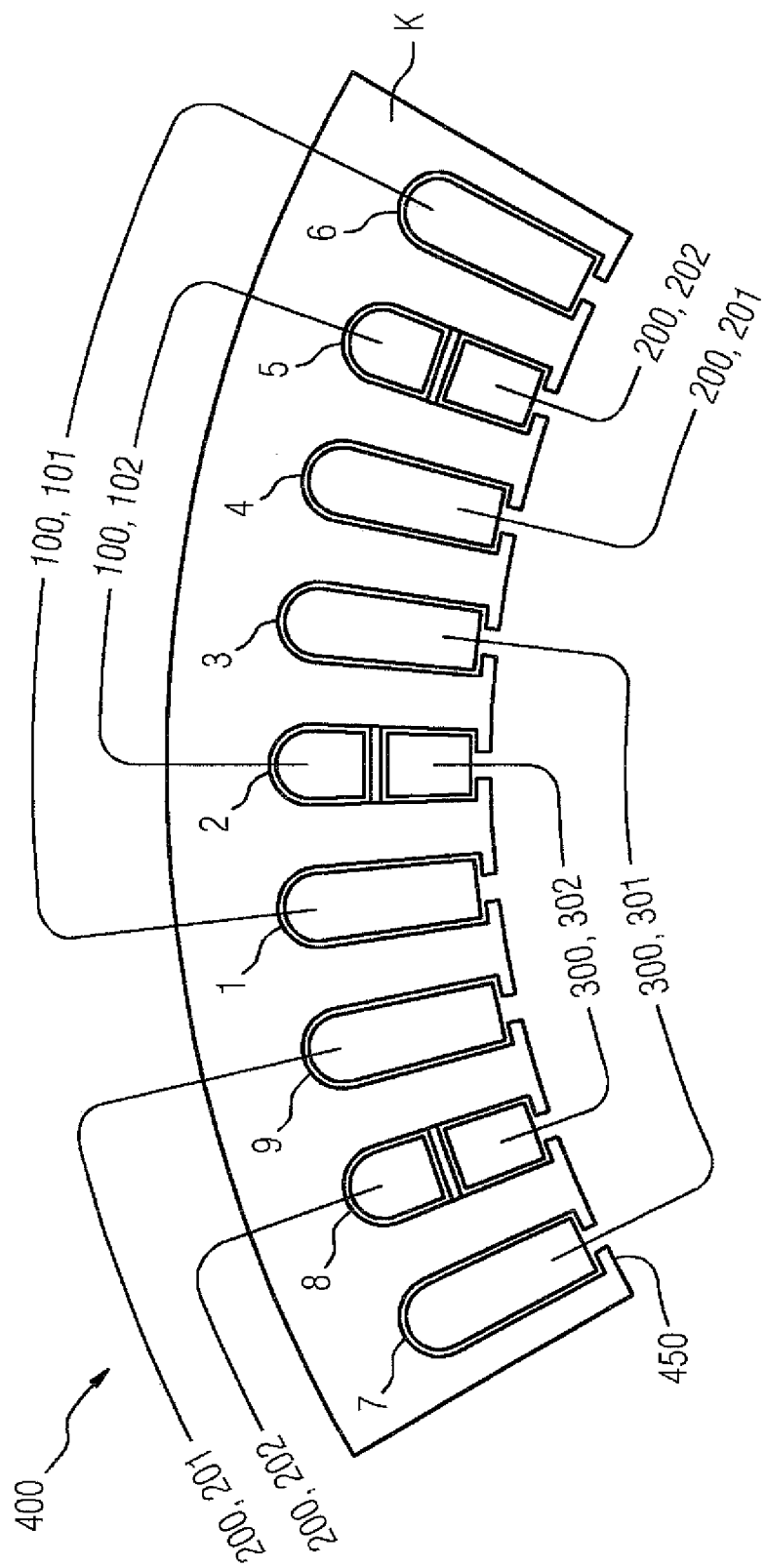

FIG. 5 shows a second exemplary embodiment of a main element 400. This exemplary embodiment only differs from the first exemplary embodiment described with reference to the FIGS. 1 to 4 in that the first coils 101, 201, 301 each have a number of windings that is more than twice as great as the number of windings of the second coils 102, 202, 302 and is calculated in such a way that the first coils 101, 201, 301 each fill a first groove 1, 3, 4, 6, 7, 9 completely. In other words, the empty spaces 550 shown in FIG. 1 are omitted in the first grooves 1, 3, 4, 6, 7, 9 and are replaced by additional windings of the first coils 101, 201, 301. As a result, on the one hand the first coils 101, 201, 301 are advantageously stabilized in the first grooves 1, 3, 4, 6, 7, 9 without an additional stabilization mass. On the other hand, the additional windings of the first coils 101, 201, 301 bring about improvements vis-à-vis the first exemplary embodiment which are described hereinafter with reference to FIGS. 6 to 8.

Figure 6:
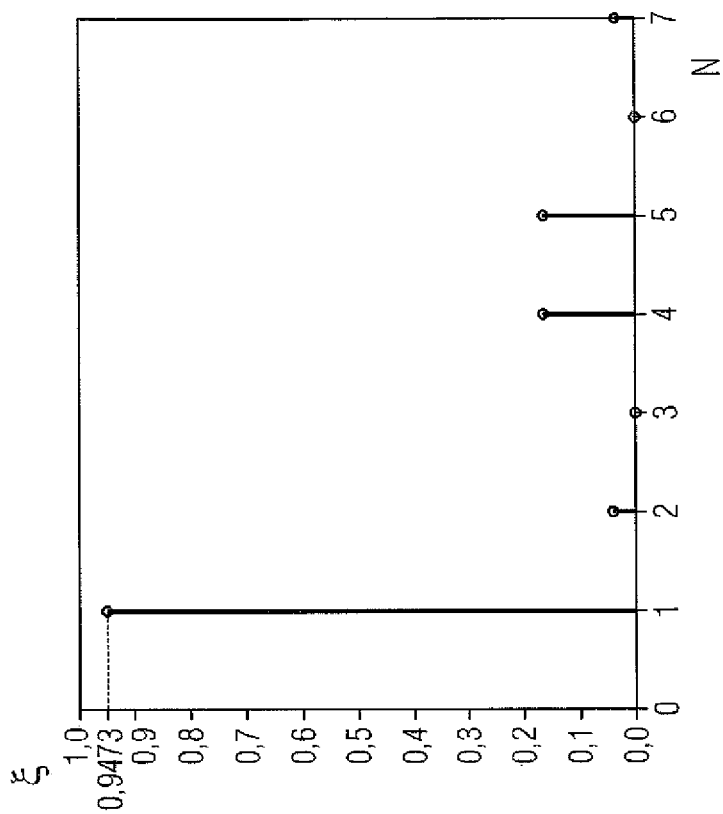

In a diagram, FIG. 6 shows a winding factor range of a winding factor $\xi$ of a stator dimensional field of the first exemplary embodiment shown in FIG. 1 for sky waves of different atomic numbers N.

Figure 7:
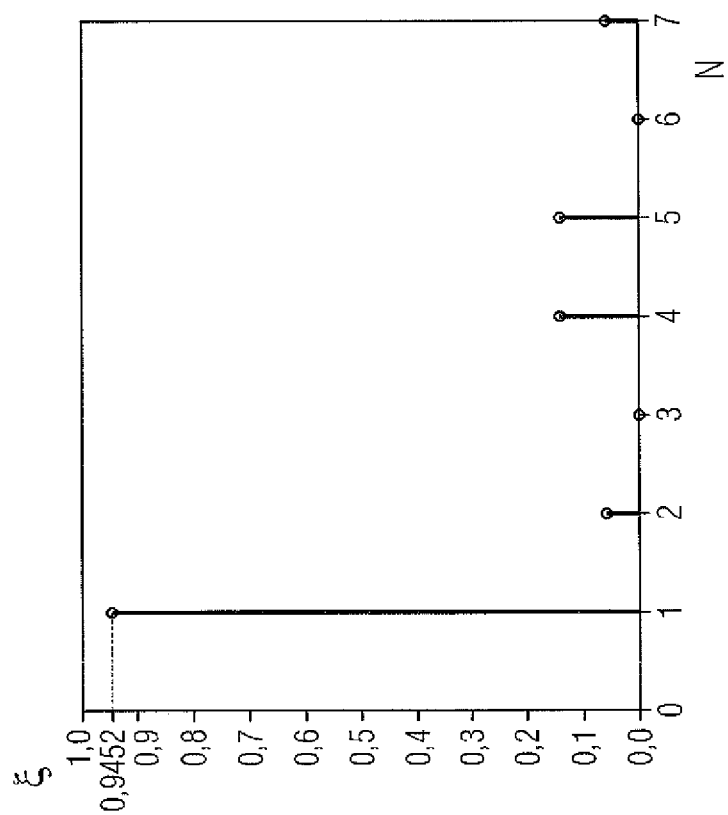

Analogous to FIG. 6, FIG. 7 shows a winding factor range of a winding factor $\xi$ of the stator dimensional field of the second exemplary embodiment for sky waves of different atomic numbers N shown in FIG. 5. The comparison with FIG. 6 shows that the second exemplary embodiment shows a slight improvement with regard to the winding factor range vis-à-vis the first exemplary embodiment.

Figure 8:
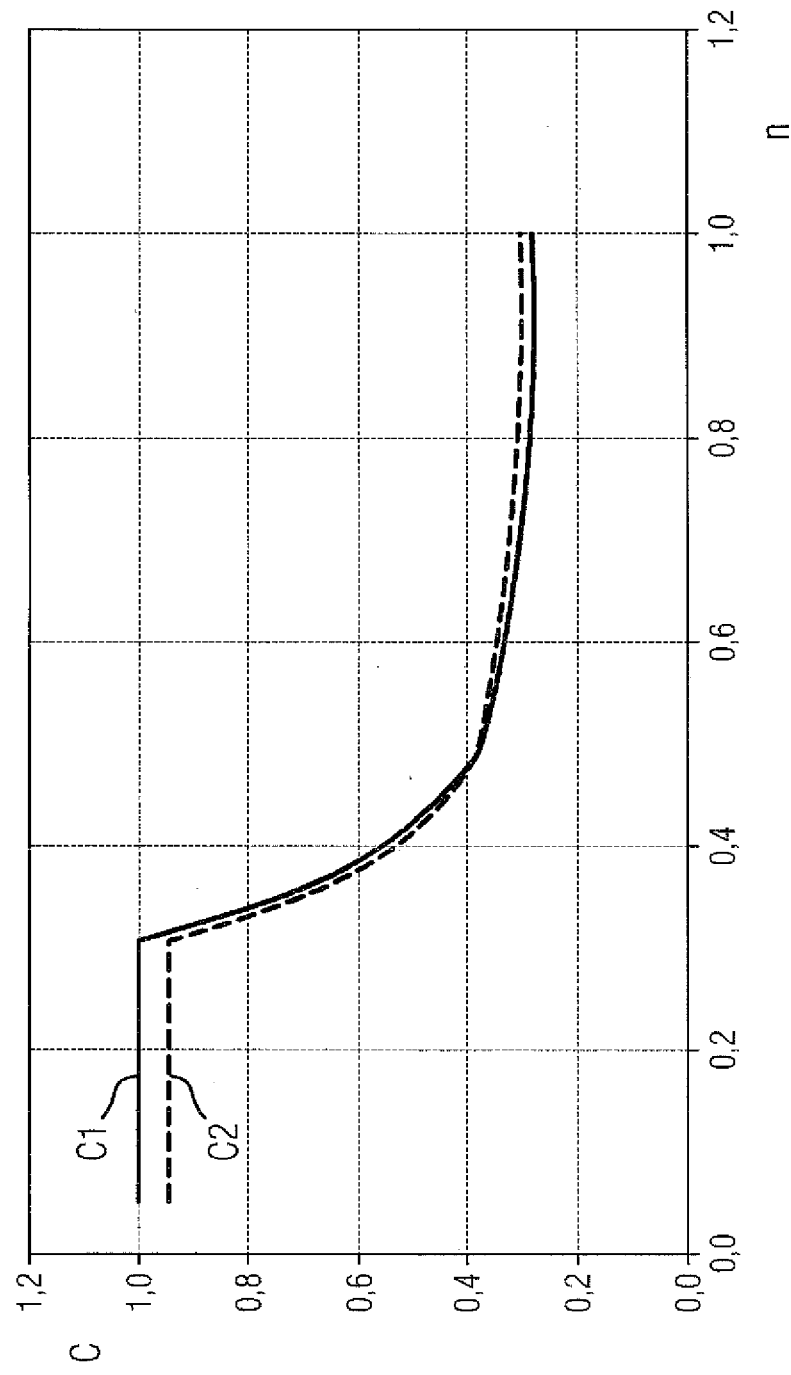

FIG. 8 shows standardized copper losses C of the windings of the exemplary embodiments shown in FIGS. 1 and 5 as a function of a standardized speed n. A first copper loss process CI shows the copper losses C of the first exemplary embodiment shown in FIG. 1 and a second copper loss process C2 shows the copper losses C of the second exemplary embodiment shown in FIG. 5. As a result of the distribution of the first coils 101, 201, 301, the windings of both exemplary embodiments display an asymmetry which can cause asymmetrical string currents in the winding strands 100, 200, 300 as a result of the groove scattering effect. FIG. 8 shows that this current asymmetry is less pronounced in the second exemplary embodiment than in the first exemplary embodiment. This too is a consequence and advantageous effect of the additional windings of the first coils 101, 201, 301 of the second exemplary embodiment.

The windings of both exemplary embodiments are each produced by first retracting all the coils 101, 102 of the first winding strand 100 simultaneously into the respectively associated grooves 1, 2, 5, 6. Thereafter partition walls 550 are introduced into the second grooves 2, 5 through which a second coil 102 of the first winding strand 100 runs. Then all the coils 201, 202 of the second winding strand 200 are simultaneously retracted into the respectively associated grooves 4, 5, 8, 9. Thereafter partition walls 550 are introduced into the second grooves 8, which have no partition walls 550 yet. Then all the coils 301, 302 of the third winding strand 300 are simultaneously retracted into the respectively associated grooves 2, 3, 7, 8. In the case of the first exemplary embodiment, finally the stabilization mass is also introduced into the empty spaces 500 of the first grooves 1, 3, 4, 6, 7, 9. This production method is facilitated by the aforementioned distribution of first coils 101, 201, 301 and second coils 102, 202, 302 to first grooves 1, 3, 4, 6, 7, 9 and second grooves 2, 5, 8.

Although the invention was illustrated and described in more detail by means of preferred exemplary embodiments, the invention is not limited by the disclosed examples and other variations may be derived from it by a person skilled in the art without departing from the scope of the invention. As the area plan Z shown in FIGS. 2 and 3 comprises identical partial area plans S in each case, each with nine grooves 1 to 9, the exemplary embodiments described with reference to FIGS. 1 to 5 can in particular be modified in an obvious way to form further exemplary embodiments of main elements 400 with a number of grooves comprising any multiple of nine.

The invention claimed is:

1. A main element of an electric machine, said main element comprising:
    three winding strands having electric coils which are interconnected so as to be electrically conductive; and
    a winding core having neighboring grooves, defining first grooves and second grooves, for passage of the coils of the winding strands, with the first grooves configured for passage of a single coil, and with the second grooves configured for passage of two different coils, each coil of each of the winding strands being either a first coil which runs through two first grooves, or a second coil which runs through two second grooves;
    each winding strand comprising the first coil and the second coil, the second coil of each winding strand forming an upper layer in one of the two second grooves, and a lower layer in the other one of the two second grooves, with all of the first coils of the winding strands having a same first number of windings, and all of the second coils of the winding strands having a same second number of windings, with the first number of windings being more than twice as great as the second number of windings.

2. The main element of claim 1, wherein the first coil of each winding strand runs through a pair of two of the first grooves, between which pair are located at least two further first grooves and at least two second grooves which are located between two of the first grooves of a pair of grooves through which a first coil of a same winding strand runs.

3. The main element of claim 2, wherein the further first grooves between the two first grooves of a pair of grooves for passage of a first coil of a winding strand are each located between the two second grooves which are located between the two first grooves for passage of first coils of two different winding strands, with said two different winding strands differing from the winding strand which pertains to the first coil for passage through the pair of grooves.

4. The main element of claim 1, further comprising an electrically insulating partition wall separating the two second coils that run through the second grooves.

5. The main element of claim 1, wherein the winding strands form a fractional slot winding.

6. A method for producing a main element of an electric machine comprising:
    providing three winding strands having electric coils which are interconnected so as to be electrically conductive; and
    simultaneously drawing a plurality of coils of at least one winding strand into grooves of a winding core having neighboring grooves, defining first grooves and second grooves, for passage of the coils of the winding strands, with the first grooves configured for passage of a single coil, and with the second grooves configured for passage of two different coils, each coil of each of the winding strands being either a first coil which runs through two first grooves, or a second coil which runs through two second grooves, said each winding strand comprising the first coil and the second coil, the second coil of each winding strand forming an upper layer in one of the two second grooves, and a lower layer in the other one of the two second grooves, with all of the first coils of the winding strands having a same first number of windings, and all of the second coils of the winding strands having a same second number of windings, with the first number of windings being more than twice as great as the second number of windings.

* * * * *